Feb. 3, 1953 D. W. STROM 2,627,105
PLUNGER MOUNTING FOR TURRETS
Filed Jan. 25, 1946 2 SHEETS—SHEET 1

INVENTOR
David W. Strom,
BY
Parker, Prochnow & Farmer,
ATTORNEYS

Feb. 3, 1953 D. W. STROM 2,627,105
PLUNGER MOUNTING FOR TURRETS
Filed Jan. 25, 1946 2 SHEETS—SHEET 2

INVENTOR
David W. Strom,
BY
Parker, Prochnow & Farmer,
ATTORNEYS

Patented Feb. 3, 1953

2,627,105

UNITED STATES PATENT OFFICE 2,627,105

PLUNGER MOUNTING FOR TURRETS

David W. Strom, Elmira, N. Y., assignor to Hardinge Brothers, Inc., Elmira, N. Y.

Application January 25, 1946, Serial No. 643,389

3 Claims. (Cl. 29—45)

This invention relates to improvements in the mounting of plungers of the kind which are movable in the direction of their length for engaging and disengaging turret heads of machine tools for indexing the same.

The accuracy of work done by a machine tool having a turret depends very largely upon the accuracy with which the turret head is indexed for each successive operation on the work, and also upon holding the turret head against movement out of such position during a cutting operation. The plungers of turrets which hold the turret heads must also be freely slidable into and out of engagement with the turret head index ring, and any looseness or play of the plunger relatively to the bearing or guide in which the plunger slides will, consequently, result in inaccuracy in the work, this being particularly the case when the tolerances within which the work must be machined are small.

One of the objects of this invention is to provide a plunger mounting for a turret of improved construction whereby extreme accuracy in the indexing and holding of the turret head may be attained. Another object of this invention is to provide a construction of this kind by means of which wear resulting from the reciprocating movement of the plunger may be readily compensated for. A further object is to provide an improved mounting of this type in which roller bearings may be employed in connection with the plunger of a turret and which bearings may be adjusted to compensate for any wear resulting from the movement of the plunger and to preload said bearings. Other objects and advantages of this invention will appear from the following description and claims.

Figure 6:
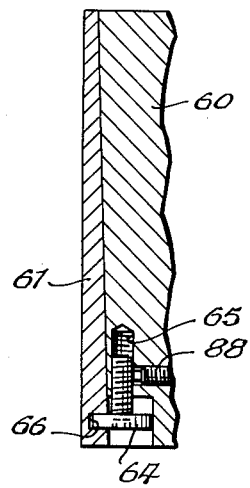
Figure 5:
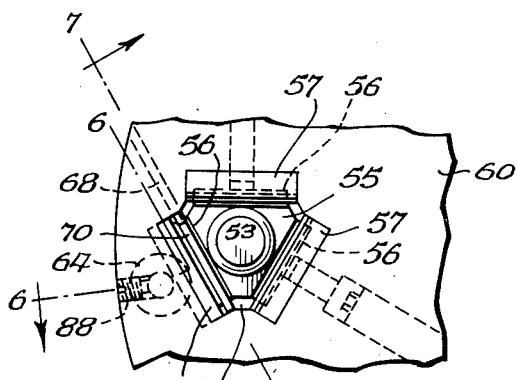
Fig. 5 is a fragmentary plan view thereof, taken on line 5—5, Fig. 4.
Figure 7:
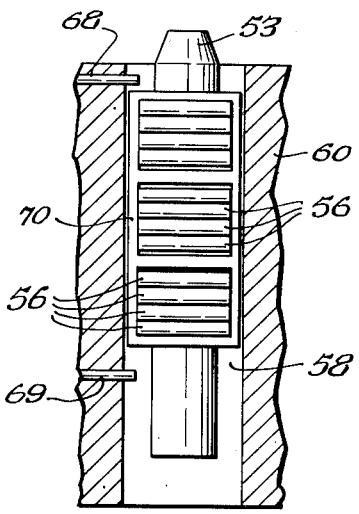

Figs. 6 and 7 are fragmentary sectional elevations, respectively on lines 6—6 and 7—7, Fig. 5.

Figure 8:
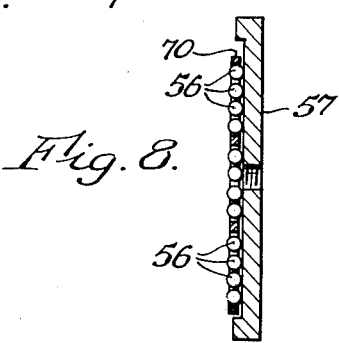

Fig. 8 is a sectional elevation showing a roller bearing and race therefor detached from the turret mounting.

This invention is shown in the drawings as particularly applied to a turret for a lathe, but it will be understood that the plunger mounting embodying this invention may be applied to other machines.

Figure 1:
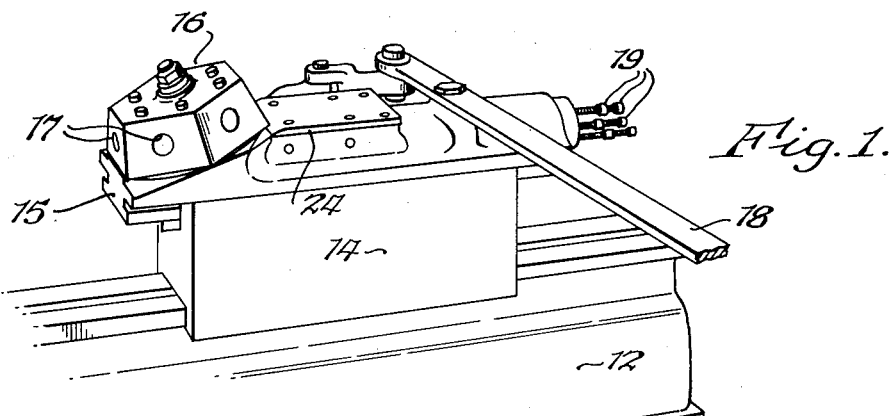
Fig. 1 is a perspective view of a turret mounted on a lathe bed.

In Fig. 1, 12 represents the bed of a lathe to which a turret plunger mounting embodying this invention may be applied. The turret assembly as shown in Fig. 1 includes a base 14 suitably secured to the bed and having a carriage 15 suitably mounted thereon for movement in a direction lengthwise of the bed of the lathe toward and from the work. A turret head 16 is rotatably mounted on the carriage and is provided with the usual apertures or tool receiving sockets 17 to receive different tools which are to be used successively for operating on the work. The particular turret shown also includes an actuating lever 18 by means of which the carriage may be moved toward and from the work, but automatic means for effecting movement of the carriage may be used, if desired. 19 represents the usual adjusting screws for controlling the extent of movement of the carriage for each tool carried by the turret head. The motion of the carriage relatively to its base 14 effects the turning of the turret through the medium of any suitable or usual mechanism (not shown). The turret head is held in any of its various positions by means of a plunger which cooperates with an index ring or other part of a turret head, an index ring 20 being shown in Figs. 2 and 3, which is rigidly secured to the turret head 16. The index ring is provided with a plurality of recesses or notches 21 in its periphery which are accurately formed and into which one end of a plunger 22 may enter for holding the index ring and the turret head against turning. In the construction illustrated, the turret head has six tool sockets 17 and, consequently, the index ring has six recesses 21 which are accurately located with reference to the tool receiving sockets or holders in the turret head, but any desired number of tool sockets may be provided, and a corresponding number of recesses in the index ring.

The plunger 22 is slidable in a plunger guide arranged in a depressed or recessed portion 23 of the carriage 15, and this recessed portion is usually covered by means of a cover plate 24, Fig. 1. The movement of the plunger into and out of engagement with the index ring may be effected in the usual manner, for example, by means of a plunger operating lever 25, fulcrumed at 26 on the carriage. One end of the lever extends into an aperture 27 formed in the plunger, and the other end of the lever may engage with parts of the base 14 as has heretofore been customary in connection with turret assemblies. A spring 28 urges the plunger into seating position in a recess in the index ring, the spring being compressed when the plunger is withdrawn from its seating position by the plunger operating lever 25.

In prior constructions, the plunger 22 was guided between rigid bearings in which the plunger could slide toward and from the index ring. In order that the plunger could slide freely enough to be easily operated, a certain amount of clearance was necessary between the plunger and its bearings, which clearance would permit a certain amount of sidewise movement of the plunger. An oil film was necessarily provided in these sliding bearings, and since any oil film is compressible when pressure is exerted against the same, this compression resulted in sidewise movement of the plunger. Even though this movement was very small, it, nevertheless, produced a considerably greater amount of movement of the tools in the turret head, for the reason that these tools projected to a considerable distance beyond the head, which distance was several times greater than the radius of the index ring. Consequently, any looseness in the plunger resulting in movement of the index ring and the turret head about its pivot, would permit a movement of the tools mounted in the turret head which would be several times greater than the movement of the index ring and plunger. Furthermore, bearings of the kind heretofore used were subject to considerable wear and this wear resulted in further looseness of the plunger and further inaccuracies in the work. It was, consequently, extremely difficult to do work with plunger mountings of this type in which high accuracy was required and in which tolerances required were only a few 10,000ths of an inch.

In order to overcome these difficulties, I have provided an improved mounting for plungers of this type in which roller bearings are employed for guiding the plunger toward and from the index ring. These roller bearings can be made with a high degree of accuracy and result in very much less wear on the plunger and the races with which the roller bearings cooperate. Furthermore, these roller bearings can be preloaded so as to substantially eliminate the sidewise movement of the plunger, and at the same time permit the plunger to move freely toward and from the index ring.

Figure 2:
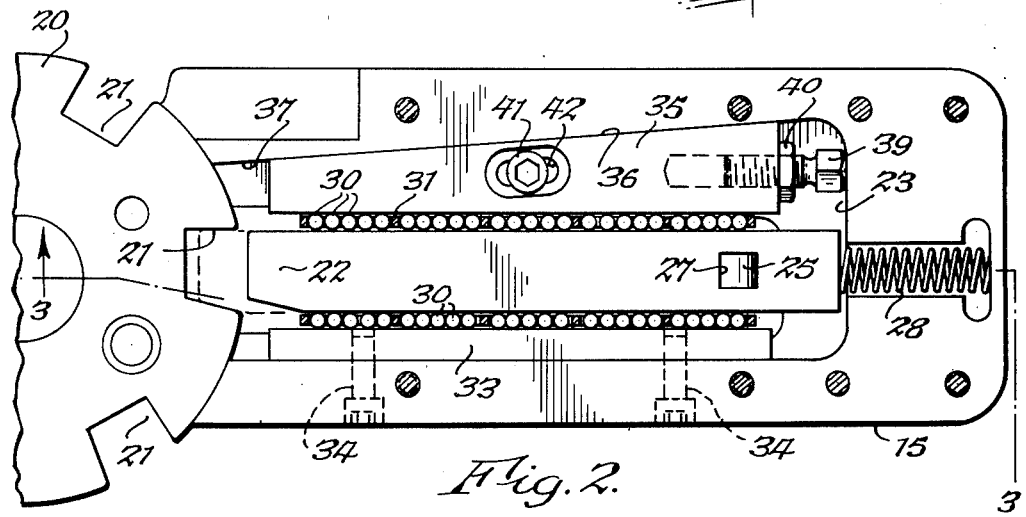
Fig. 2 is a top plan view of a plunger mounting embodying this invention, the cover of the plunger housing being removed.
Figure 3:
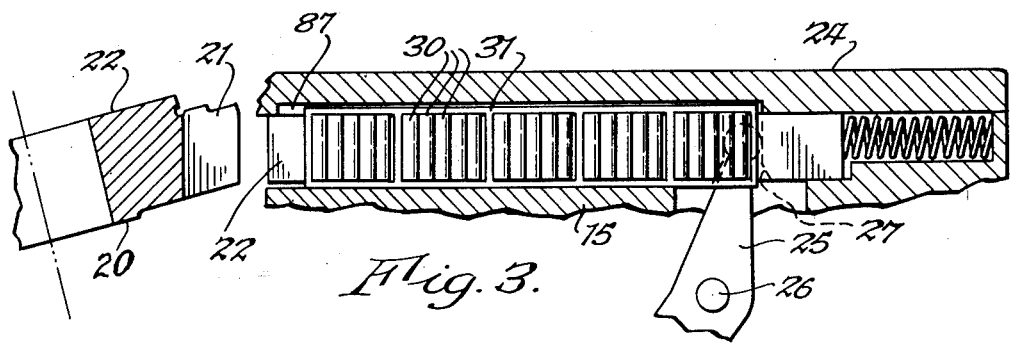
Fig. 3 is a fragmentary longitudinal sectional elevation thereof, on line 3—3, Fig. 2.
Figure 4:
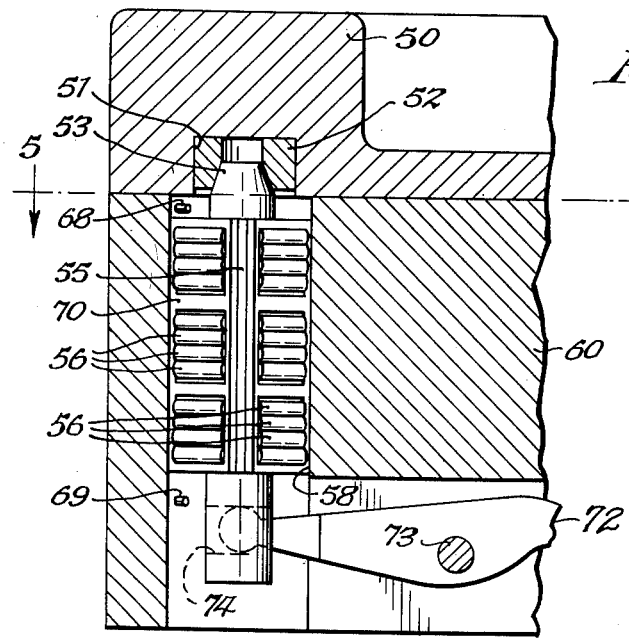
Fig. 4 is a fragmentary sectional elevation of a plunger mounting embodying this invention for use in connection with a turret of different construction.

In the construction illustrated in Figs. 1 to 3, roller bearings are provided at opposite sides of the plunger 22, which roller bearings include rollers 30 arranged within a retainer 31 of any usual or suitable construction. Slots 87 are arranged in the lower face of the cover plate 24 to receive the upper edges of the retainers. The ends of these slots serve as stops to limit the movement of the rollers and retainers lengthwise of the plunger 22 in the recessed portion 23. The rollers at one side of the plunger bear against a hardened steel plate or race 33 removably secured in the recess 23 in the upper portion of the carriage 15, against one of the walls of the recess, for example, by means of screws 34. The rollers, on the other side of the plunger operate in contact with a hardened race 35 which is preferably adjustable to take up wear and to permit preloading of the rolling bearings to the desired extent. This adjustment may be effected in any desired manner, and in the construction illustrated by way of example, the race 35 is in the form of a gib of tapering or wedge form having a side 36 which is inclined with reference to the length of the plunger, and which bears against a correspondingly inclined surface 37 formed within the recess 23 of the carriage 15. The gib 35 is adjustable lengthwise of the plunger in any suitable manner, for example, by means of a screw 39 having a threaded engagement in a hole formed in one end of the gib, the head of the screw bearing against the end wall of the recess 23, so as to force the gib into engagement with the adjacent rollers. A lock nut 40 may be used to hold the gib in adjusted position, and a bolt or screw 41 passing through a slot 42 of the gib and having the threaded portion thereof engaging the carriage 15 may also be used for clamping the gib in adjusted position. By means of the screw 39, sufficient pressure may be exerted on the gib 35 so as to preload the roller bearings. Consequently, by means of this construction, the plunger 22 may be guided by means of the roller bearings in such a manner that the plunger will move very easily and with a minimum of friction due to the rolling contact with the rollers 30, and at the same time by preloading the rollers, sidewise movement of the plunger may be practically eliminated. This accuracy in the movement of the plunger will result in a corresponding increase in accuracy in the indexing and holding of the turret head.

In Figs. 4 to 8, I have shown my invention applied to a turret of different construction in which the index ring is formed by the turret head 50, which has a series of accurately located holes or recesses 51 in the undersurface thereof, which may be provided with suitable sleeves or liners 52 having frustoconical inner surfaces with which a correspondingly-shaped end 53 of the plunger may cooperate. The plunger in this construction has a shank or body portion 55, which has three flat sides, the body portion of the plunger being substantially triangular in cross section. In this construction, roller bearings 56 are provided for the three flat sides of the body portion of the plunger, the outer portions of the rollers on two sides bearing against fixed hardened races or plates 57 which may be suitably secured to the walls of the recess or aperture 58 formed in the carriage 60 of the turret. In order to provide for preloading of the bearings and for compensating for wear of the movable parts, suitable wedge means are provided, such as a gib 61, which is slidable along a flat inclined inner face of the recess 58. This gib may be adjusted by means of a screw 64 cooperating with a threaded aperture 65 in the carriage and having a flat head, a portion of which enters into a slot 66 formed near one end of the gib 61. Consequently, the screw, when turned to move it into or out of the hole 65, will carry the gib with it. A lock screw 88 with brass plug is provided for locking the screw 64 and to hold the gib in adjusted position. In this construction, pins 68 and 69 are employed for limiting the movement of the roller bearings and their cages or retainer plates 70 lengthwise of the apertures 58.

In this construction, movement may be imparted to the plunger by means of a lever 72 pivoted at 73 and having one end thereof extending into a hole or slot 74 in the end of the plunger.

The constructions shown in Figs. 4 to 8 have the same advantages as those shown in Figs. 1 to 3, in that the roller bearings shown in Figs. 4 to 8 not only greatly reduce the frictional resistance to movement of the plunger, but also greatly increase the accuracy of movement of the plunger and permit the plunger to be held very rigidly against lateral movement by the turret, thus making it possible to produce work with a much higher degree of accuracy than is possible in the prior construction in which surfaces of the plunger bore directly against stationary flat surfaces for guiding the plunger. These roller bearings also greatly decrease the wear of the parts and the gibs cooperating with the rolling bearings, serve the two-fold purpose of compensating for wear of the bearings and of preloading the bearings, so that lateral movement of the plunger may be practically eliminated in the direction controlling radial movement of the head. The plunger mountings described greatly increase the life of turrets because of the reduced wear resulting from the rolling bearings, and because the races may be removed when excessively worn, and replaced by new ones.

While I have shown only a single tapered gib in each of the constructions illustrated, it will be obvious that if desired, all of the races employed may be in the form of tapered gibs, so that wear may be compensated for by adjusting either or both of the races. In Figs. 4 to 8 in which a plunger of triangular cross section is employed, two of the races may be in the form of adjustable tapered gibs, similar to the gib 61.

I claim is my invention:

1. In a locking device for turrets of machine tools of the type in which the turret is accurately and positively locked in different successive positions by engagement therewith of a reciprocating locking plunger, that improvement which comprises a plunger, a base having a recess in which said plunger is mounted for endwise reciprocation into and out of locking position with said turret, one wall of said recess being parallel to the longitudinal axis of said plunger and to the direction of reciprocation of said plunger, a tapered gib disposed in said recess between said plunger and another wall of said recess and extending lengthwise in said direction of reciprocation, said another wall of said recess and the abutting face of said gib making a small angle to said plunger axis so as to wedge the gib against said plunger and recess wall when said gib is moved in one direction parallel to said direction of reciprocation, roller surface bearings with retainer strips disposed between a plunger side and the gib, and also between an opposite plunger side and another wall of said recess, an inelastic screw device acting between said base and gib for positively forcing said gib endwise in a direction to wedge said gib against said plunger and to take up slack and preload said bearings with a desired positive pressure, said base having stops in said recess in the path of travel of said retainers for limiting their movements in directions parallel to said directions of reciprocations, and means acting between said base and plunger for retracting said plunger from engagement with said turret.

2. In a locking device for turrets of machine tools of the type in which the turret is accurately and positively locked in different successive positions by engagement therewith of a reciprocating locking plunger, that improvement which comprises said plunger, having triangularly disposed side faces, a base having a recess with three side walls disposed in a similar triangular relation as said plunger faces with said walls extending lengthwise of said plunger, said plunger being disposed and mounted in said recess for endwise reciprocation into and out of locking position with said turret, two of said side walls of said recess being parallel to the longitudinal axis of said plunger and to the direction of reciprocation of said plunger, a lengthwise tapered gib disposed in said recess between said plunger and the third side wall of said recess and extending in a direction lengthwise of said plunger, said third wall of said recess and abutting face of said gib making a small angle to said plunger axis, so as to wedge the gib against said plunger and third recess wall when said gib is moved in one direction geenrally parallel to said direction of reciprocation, roller surface bearings with retainer strips, one disposed between one of said plunger side faces and said gib and others between said other plunger side faces and said two recess side walls, an inelastic screw device acting between said gib and base for positively forcing said gib endwise in a direction to wedge said gib against sad plunger and to take up slack and preload said bearings with a selected adjustable positive pressure normal to said plunger side faces said base base having stops in said recess in the path of travel of said retainer and for limiting their movements in directions parallel to said direction of reciprocation, and means acting between said plunger and base for retracting said plunger from engagement with said turret.

3. In a locking device for turrets of machine tools of the type in which the turret is accurately and positively locked in different successive positions by engagement therewith of a reciprocating locking plunger, that improvement which comprises said plunger, said turret with successively arranged locking openings in a face thereof, a base having a surface over which said turret face moves, with a recess in said surface opening through that surface, said recess having triangularly positioned side walls extending toward said surface, said plunger having triangularly disposed side faces similar in relation to said side walls of said recess, said plunger being disposed in said recess for endwise reciprocation toward and from said base surface, a tapered gib disposed between one of said side faces of said plunger and the corresponding side wall of said recess, the side wall of said gib adjoining the plunger being parallel to the adjacent side face of said plunger, the opposite side wall of said gib and abutting side wall of said recess making a small angle to the longitudinal axis of said plunger so as to create a wedging action of the gib against said plunger when the gib is moved endwise in one direction generally parallel to said direction of reciprocation, a plurality of roller surface bearings with retainer strips for the roller elements thereof, one of said bearings being disposed between said gib and the adjacent side face of said plunger and the others between the other side faces of said plunger and the adjacent side walls of the recess, an inelastic manually operated device acting between this base and said gib for positively forcing said gib endwise in a direction to wedge said gib against said plunger, take up slack and clearance between the plunger and recess side walls, and preload said bearings with a selected adjustable, positive pressure normal to the plunger side faces, said base having stops in the path of travel of said retainers for limiting their endwise movements, and means acting between said plunger and base for reciprocating said plunger into and out of locking engagement with said turret openings.

DAVID W. STROM.

REFERENCES CITED

The following references are of record in the file of this patent:

UNITED STATES PATENTS

| Number | Name | Date |
|---|---|---|
| 332,577 | Whitlock | Dec. 15, 1885 |
| 466,646 | Woodruff | Jan. 5, 1892 |
| 1,443,965 | Parsons | Feb. 6, 1923 |
| 1,738,101 | Graham | Dec. 3, 1929 |
| 1,953,876 | Burrell | Apr. 3, 1934 |
| 1,979,252 | Chedester | Nov. 6, 1934 |
| 2,047,868 | Harley | July 14, 1936 |
| 2,330,154 | Stabinski | Sept. 21, 1943 |